United States Patent [19]

McClendon et al.

[11] 3,725,387
[45] Apr. 3, 1973

[54] AMINOETHYLATION OF FLOUR AND STARCH WITH ETHYLENIMINE

[75] Inventors: Jack C. McClendon; Elton L. Berry, both of Lake Jackson, Tex. 77566

[73] Assignee: The Dow Chemical Company, Midland, Mich.

[22] Filed: Apr. 21, 1971

[21] Appl. No.: 136,219

[52] U.S. Cl. ............260/233.3 R, 162/175, 260/9 R, 260/17.3
[51] Int. Cl. .............................................C08b 19/04
[58] Field of Search ...260/9, 17.3 R, 17.3 S, 233.3 R

[56] References Cited

UNITED STATES PATENTS

| 3,522,238 | 7/1970 | Rankin et al. | 260/233.3 |
|---|---|---|---|
| 3,464,974 | 9/1969 | Gramera et al. | 260/233.3 |
| 3,331,833 | 7/1967 | Jarowenko | 260/233.3 |

FOREIGN PATENTS OR APPLICATIONS

| 525,108 | 5/1956 | Canada | 260/233.3 |

OTHER PUBLICATIONS

Kerr, Die Starke, Vol. 4, No. 10, pages 225 to 257, Oct. 1952.
Tappi, Vol. 52, Sept.–Dec. 1969, pg, 1647 to 1651.
Chemical Abstracts, Vol. 47, No. 3593f (1953).

*Primary Examiner*—Donald E. Czaja
*Assistant Examiner*—Melvyn I. Marquis
*Attorney*—Griswold & Burdick, L. Wayne White and C. E. Rehberg

[57] ABSTRACT

Aminoethylated farinaceous materials, e.g., aminoethylated flours and starches, are prepared in the novel process comprising the steps of (A) contacting (1) ethylenimine in the vapor phase with (2) a farinaceous material(s) at a temperature below the dew point of the ethylenimine vapor, and (B) thereafter heating the reaction mixture to a temperature sufficient to cause reaction between (1) and (2). In a preferred embodiment, the reaction mixture from step (A) is maintained at a temperature below the boiling point of ethylenimine until the temperature exotherm which is observed reaches a maximum before heating the mixture (as per Step B). The aminoethylated products produced by the above process are novel products having utility, for example, as pigment binders and dry strength additives in paper.

12 Claims, No Drawings

AMINOETHYLATION OF FLOUR AND STARCH WITH ETHYLENIMINE

BACKGROUND OF THE INVENTION

Cationic starches and flours have been previously prepared by reacting ethylenimine (aziridine) with various starches and flours. The reaction has been conducted in solvents or diluents (such as water, toluene, etc.) and also in a "dry" or "semi-dry" state. In the latter instances, liquid ethylenimine or a stream of vapor containing ethylenimine was added to granular starch or flour and the mixture heated to reaction temperature (e.g., 90°–100° C.), or, undiluted gaseous ethylenimine was added to hot granular starches or flours at a temperature above the boiling point of ethylenimine (generally at 90°–100° C.).

The products so produced contained the ethylenimine predominantly as an aminoethyl ether derivative of the starch or flour. The products likewise contained polyethylenimine as a by-product which was removed with an acidified aqueous methanol wash.

Such prior art products, methods of preparation, utility, etc., are illustrated by the following references: (1) R. W. Kerr and H. Neukom, Die Starke 4 (10), 255 (1952). (2) J. C. Rankin et al., Journal of the Technical Association of the Pulp and Paper Industry (TAPPI), Vol. 52, No. 1, 82 (January, 1969). (3) H. D. Heath et al., TAPPI, Vol. 52, No. 9, 1647 (September, 1969). (4) U.S. Pat. No. 3,522,238 (J. C. Rankin et al.).

SUMMARY OF THE INVENTION

Cationic farinaceous materials, such as cationic flours and starches, are prepared in the novel process comprising the steps of
A. contacting
  1. ethylenimine (EI) in the vapor phase, with
  2. at least one granular farinaceous material at a temperature below the dew point of the EI vapor, and
B. warming the reaction mixture from (A) to a temperature sufficient to cause reaction between (1) and (2). The novel products thus produced are useful as paper additives in the paper industry (e.g., as retention aids, wet and/or dry strength additives, etc.) and as flocculants for removing anionic contaminants (such as bentonite and other silicas) from aqueous media.

The novel process and products differ from prior art processes in that: (i) EI is retained by the farinaceous substrate in very high or even quantitative amounts in the subject process; (ii) the cationic materials herein prepared typically have more nonextractable nitrogen and higher aqueous paste viscosities; and (iii) the subject cationic starches and flours are generally more effective as pigment retention aids, or wet strength or dry strength additives in paper than previous cationic starches or flours having the same amount of non-extractable nitrogen.

The subject process is broadly applicable to granular farinaceous materials. By "granular" we mean that the farinaceous material is in a solid, particulate form and may vary in particle size from granules to an impalpable powder. By "farinaceous materials," we mean the known class of meals, flours and starches derived from cereal grains and cereal grasses (such as corn, wheat, rice, rye, barley, oats, sorghum, etc.) and starch derived from tuber plants (such as potatoes and other yams, arrowroot, etc) and starch fractions (such as amylose and amylo pectin) and modified starches (such as thin boiling starches). It is recognized that some farinaceous materials (e.g., flour) contain minor amounts of proteinaceous materials, dextrin, sugars and other polysaccharides, and the like; such materials react with EI to form an aminoethylated product and thus are suitable in the subject process and are included under the term farinaceous materials. The preferred materials for use herein, however, are generally flour(s) and starch(es) with the flours and starches derived from cereal grains being most preferred based on commercial availability. The farinaceous materials may suitably bear from trace amounts up to equilibrium amounts of water.

Step (A)

Step (A) comprises charging a granular farinaceous material at a temperature below the dew point of the EI vapor to be used (20° to 30° C. being preferred) to a suitable vessel and then introducing EI (in the vapor phase) to the starch and/or flour, preferably with agitation. The EI is charged at a temperature of at least about 40° C. and preferably at a temperature above its boiling point. An inert gas (such as nitrogen, argon, etc.) is included with the EI vapors as a carrier or sweep gas at temperatures between 40° C. and the boiling point of EI. The amount of EI used can be varied depending upon the number of amino groups desired in the end product. Suitable amounts of EI in most instances, however, vary from about 0.5 percent to about 20 percent by weight, based on the dry weight of the farinaceous material. Preferred amounts of EI vary from about 1 percent to about 10 percent by weight.

Step (B)

Step (B) comprises heating the mixture from Step (A) to a temperature sufficient to cause EI to react with the farinaceous material. A convenient rate of reaction is generally obtained at temperatures of from about 80° to about 120° C. and preferred reaction rates are obtained at temperatures of from about 90° to about 100° C. At these temperatures, reaction times of from about 0.5 to about 4 hours are typical and in many instances, the reaction is substantially complete in 1 hour. Atmospheric, autogenous and superatmospheric pressures are commonly used but autogenous or superatmospheric pressures (e.g., 10–50 psig) are preferred.

Step (A) as defined above is conveniently conducted in a vessel having means to agitate the farinaceous material. The material is preferably agitated at a rate sufficient to maintain the particles in a state of turbulized suspension. Examples of suitable such vessels include those defined by U.S. Pat. No. 3,527,606, the Strong-Scott Solidaire reactor (a commercially available apparatus sold by The Strong Scott Mfg. Co., Minneapolis, Minn.), and the like. The Solidaire reactor is currently preferred since it adapts particularly well to a continuous process.

The reaction mixture from Step (A) undergoes a temperature exotherm which can be easily monitored by conventional temperature recording means. The extent of the exotherm and the time necessary for the exotherm to reach a maximum will vary depending upon the farinaceous material used. However, the exotherm generally reaches a maximum in from about 1 to about 5 hours.

As an optional but preferred embodiment, the reaction mixture from Step (A) is stored at least until the exotherm reaches a maximum prior to Step (B) and may advantageously be stored for as long as 75–100 hours or more. Storage times of from 5 to 24 hours are preferred. Storage of the reaction mixture improves retention of the EI by the farinaceous material and facilitates handling since the presence of EI vapors above the reaction mixture after storage is substantially reduced (a practical minimum being obtained at about the same time that the exotherm peaks). It also generally increases the amount of nonextractable nitrogen in the final product (after Step B). The reaction mixture from Step (A) is generally stored at ambient conditions in a closed vessel (e.g., a drum) but may be stored in a silo, a bin or a conveyor tube leading to the reaction vessel for Step (B) or other convenient vessel.

SPECIFIC EMBODIMENTS

The following examples further illustrate the invention.

Equipment:

A Strong-Scott Solidaire reactor, model SJ 84, was used in each example. Said reactor is a jacketed, horizontal tube with an agitator shaft that runs the entire length of the tube. The shaft has pins attached thereto that are canted and flattened on the end nearest the tube wall to provide mixing. The shaft speed was 1,150 r.p.m. and was sufficient to provide zero gravity to the starch or flour particles moving through the reactor tube (producing what has been described in the art as a state of turbulized suspension).

Said reactor was equipped with an auger means for continuously charging starch or flour at a uniform rate to the reactor and a screw conveyor means for continuously removing the reaction product.

EI was charged to said reactor from a weigh cell, through a rotometer, and through a steam-jacketed boiler tube. The EI entered the reactor as a hot gas through a ⅜ inch tube inlet about 1 inch downstream from the flour inlet. EI feed rates were controlled by rotometer settings and confirmed by weight readings from the weigh cells.

General Procedure:

Starch or flour at 25°–30° C. and undiluted EI vapors at about 90° C. were continuously charged to the reactor. The starch or flour was maintained in a state of turbulized suspension by the rotary action of the blades of the mixer for a total residence time of about 2.5 minutes. The mixture thus obtained was collected and transferred to a closed vessel and heated at temperatures and times sufficient to cause EI to react with the starch or flour.

EI feed rates are expressed as a percentage, based on the dry weight of the starch or flour.

The nitrogen content was determined by the conventional Kjeldahl technique.

The percent moisture was determined with an O'-Haus Moisture Balance with the lamp set at 1.5 inches above the sample; 40 watts on the heater; and the timer set for 15 minutes.

Viscosity measurements were made on a 500 g. sample of an aqueous paste or slurry of the flour or starch using a Brabender Visco/Amylo/Graph viscometer. The results are reported in Brabender units. Flour viscosities were measured on pastes having an 11.1 percent solids content. Starch viscosities were measured on pastes having 8.0 percent solids content.

Examples 1–6

In the manner described above, pregelatinized corn flour having 1.16% N content and 8.5 percent moisture content was continuously fed at 38° C. into the reactor at a rate of 98.5 lbs./hr. Undiluted EI vapors were fed at 3.37 lbs./hr. (3.42 percent). The flour discharge temperature was 42° C. The reaction mixture had a 2.28% N content and was stored in sealed drums for various time intervals, transferred to a sealed kettle and heated for 1 hour at 100° C. under autogenous pressure. The results are summarized in Table I. Brabender peak viscosity of unreacted flour was 210. Peak viscosities of all aminoethylated flour and the unreacted flour occurred at 77° C.

TABLE I

| Example | Storage Time (Hours) | Brabender Viscosity |
|---|---|---|
| 1 | 4 | 520 |
| 2 | 26 | 620 |
| 3 | 48 | 670 |
| 4 | 72 | 660 |
| 5 | 168 | 710 |
| 6 | 336 | 730 |

The corn flour used in Examples 7–14 and in Example 18 following were also samples of a pregelatinized corn flour.

Examples 7–14

The effect of reaction temperature and time during the heating step (Step B) are illustrated in Table II. Examples 7–9 were prepared using a corn flour having a viscosity of 170 and equilibrium moisture content (about 8–10 percent); the reaction mixture from Step (A) had a nitrogen content of 2.25; the mixture was stored at ambient conditions in a closed drum for 24 hours prior to heating. Examples 10–14 were prepared using a corn flour having a viscosity of 210; the reaction mixture from Step (A) had a nitrogen content of 2.03; this mixture was stored in like manner for 72 hours prior to heating. Examples 7–14 were otherwise prepared in accordance with the general procedure and Examples 1–6 above.

TABLE II

| Example | Reaction Temperature (°C.) | Time (Hours) | Product Viscosity |
|---|---|---|---|
| 7 | 80 | 1 | 330 |
| 8 | 80 | 3 | 380 |
| 9 | 80 | 20 | 440 |
| 10 | 100 | 0 | 360 |
| 11 | 100 | 0.25 | 490 |
| 12 | 100 | 0.50 | 540 |
| 13 | 100 | 0.75 | 650 |
| 14 | 100 | 1.50 | 640 |

Examples 15–17

In like manner, corn starch having a moisture content of 8.2 percent was blended with gaseous EI. In Example 15, the amount of EI was 2.6 percent, based on dry weight of starch. In Examples 16 and 17, the amount of EI was 4.2 percent. The EI was retained essentially completely by the starch in each instance. The samples were stored under ambient conditions in closed drums for various time intervals and heated for 1 hour at 100° C. under autogenous pressure. The samples (50 g. aliquots) were then individually slurried with 250 ml. of an acidified aqueous methanol (60 percent methanol by volume containing 2 ml. of 1N HCl per 100 ml. of solution) to remove non-chemically bound nitrogen. The nitrogen content of each sample was determined before and after the acidified methanol washing. The results are tabulated below.

TABLE III

| Ex. | Storage Time (Hours) | Nitrogen Content(%) Before Extraction | After Extraction | Chemically Bound Nitrogen (%) |
|---|---|---|---|---|
| 15 | 24 | 0.80 | 0.43 | 53.8 |
| 16 | 72 | 1.32 | 0.73 | 55.3 |
| 17 | 24 | 1.39 | 0.71 | 51.1 |

Each of the aminoethylated products described herein are useful in the paper industry; for example as pigment retention aids. To illustrate this, the aminoethylated starches prepared in Examples 15–17 were evaluated as follows:

A bleached Kraft pulp containing 300 g. of dry pulp in about 20 liters of water was beaten to a freeness of 500 ml. (Canadian Standard Freeness). To this was added an aqueous slurry of 100 g. of titanium dioxide and the mixture circulated in a beater for 10 minutes. The pH of the pulp mixture was adjusted to 7.0. Various amounts of aminoethylated starches prepared in Examples 15–17 were mixed with equal aliquots of the above pulp mixture and 1.2 g. handsheets were prepared therefrom via conventional techniques. The sheets were dried, cured by heating for 1 hour at 105° C., and conditioned overnight in a room of constant humidity. The handsheets were then ashed to determine titanium dioxide content. The results are summarized in Table IV. The above procedure is essentially the test procedure outlined in TAPPI 227, M 58 (freeness of pulp); and TAPPI 205, M 58 (handsheet preparation).

TABLE IV

| Product of Example | % $TiO_2$ Retention | | | |
|---|---|---|---|---|
| | 5 lbs./ton* | 10 lbs./ton | 15 lbs./ton | 20 lbs./ton |
| 15 | 21 | 43 | 73 | 78 |
| 16 | 23 | 60 | 78 | 86 |
| 17 | 27 | 73 | 81 | 88 |

*Loading of aminoethylated starch of 5 lbs. per ton of pulp, dry weight basis. Same explanation for other columns except for loading.

A control sample was determined by ashing a handsheet prepared from the pulp/$TiO_2$ mixture without any amino-ethylated starch added; percent $TiO_2$ retention was about 11–12.

Other aminoethylated products prepared in accordance with the novel process are similarly useful.

In Examples 1–17, an exothermic temperature rise from ambient temperature up to about 40°–60° C. was observed in each reaction mixture after the mixing step (Step A). The maximum temperature being reached generally in about 4–5 hours.

Example 18

Corn flour (102 lbs.) having a moisture content of 8.6 percent was charged to a closed reaction vessel equipped with a stirring means and vented to a scrubber. Four pounds of diluted EI vapors at about 90° C. were charged into the stirred flour over a 5 hour period. The temperature of the reaction mixture rose from ambient temperature to about 47° C. during the addition period. The reaction mixture contained 2.3 percent nitrogen and 8.5 percent moisture. The mixture was stored for 24 hours under ambient conditions in a closed drum and then heated for 1 hour at 95° C. under a positive pressure of nitrogen (approximately 30 psig). The product had a viscosity of 700 and had similar properties and utilities as the aminoethylated flours prepared in the previous examples.

All viscosities were measured on a Brabender VISCO/amylo/GRAPH which was calibrated against a standard curve to ± 20 units obtained using an 8.7 percent solids solution of a standard starch which had been run on a Brabender Model VA–1, Serial No. 577. It had a peak viscosity of 680 units at 92.5° C.

We claim:

1. A process for preparing aminoethylated farinaceous materials comprising the steps of
    A. contacting
        1. ethylenimine in the vapor phase at a temperature of at least about 40° C., with
        2. at least one granular farinaceous material at a temperature below the dew point of the ethylenimine vapor, and
    B. warming the reaction mixture from (A) to a temperature sufficient to cause reaction between (1) and (2).

2. The process defined by claim 1 wherein (2) is flour or starch.

3. The process defined by claim 2 wherein said flour or starch is derived from cereal grains, cereal grasses or tuber plants.

4. The process defined by claim 3 wherein said flour or starch is derived from cereal grains.

5. The process defined by claim 1 wherein said ethylenimine is at a temperature equal to or greater than its boiling point.

6. The process defined by claim 1 wherein the temperature of said farinaceous material in Step A is from about 10° C. to about 40° C.

7. The process defined by claim 1 wherein Step (B) is conducted at a temperature of from about 80° C. to about 120° C.

8. The process defined by claim 7 wherein said temperature is from about 90° C. to about 110° C.

9. The process defined by claim 1 wherein said farinaceous material bears from trace amounts to equilibrium amounts of water.

10. A process for preparing aminoethylated farinaceous materials comprising the steps of
    A. contacting
        1. ethylenimine in the vapor phase at a temperature of at least about 40° C. with
        2. at least one granular farinaceous material at a temperature below the dew point of the ethylenimine vapor, B. maintaining the reaction mixture from (A) at a temperature below the boiling point of ethylenimine for a time at least sufficient for the exothermic temperature rise of the mixture to attain essentially the maximum value, and C. warming the reaction mixture from (B) to a temperature sufficient for reaction between (1) and (2).

11. The process defined by claim 2 wherein (2) is flour.

12. The process defined by claim 2 wherein (2) is starch.

* * * * *